United States Patent
Munte et al.

(10) Patent No.: US 11,618,378 B2
(45) Date of Patent: Apr. 4, 2023

(54) METHODS AND SYSTEMS FOR GUIDING AN OPERATOR OF A VEHICLE DURING A VEHICLE-SHARING SESSION

(71) Applicants: DENSO International America, Inc., Southfield, MI (US); DENSO CORPORATION, Aichi (JP)

(72) Inventors: Christian Munte, Southfield, MI (US); Martin Nespolo, Gross Pointe Woods, MI (US); Nandhinee Kandasamy, Novi, MI (US)

(73) Assignees: DENSO INTERNATIONAL AMERICA, INC., Southfield, MI (US); DENSO CORPORATION, Aichi (JP)

( * ) Notice: Subject to any disclaimer, the term of this patent is extended or adjusted under 35 U.S.C. 154(b) by 105 days.

(21) Appl. No.: 17/218,406

(22) Filed: Mar. 31, 2021

(65) Prior Publication Data

US 2022/0024381 A1    Jan. 27, 2022

Related U.S. Application Data

(60) Provisional application No. 63/055,514, filed on Jul. 23, 2020.

(51) Int. Cl.
*B60Q 1/00* (2006.01)
*B60Q 9/00* (2006.01)
*G08B 7/06* (2006.01)
*G06F 3/0484* (2022.01)

(52) U.S. Cl.
CPC ............... *B60Q 9/00* (2013.01); *G08B 7/06* (2013.01); *G06F 3/0484* (2013.01)

(58) Field of Classification Search
CPC ........... B60Q 9/00; G08B 7/06; G06F 3/0484; G06Q 50/30; B60K 35/00
USPC ........................................................ 340/438
See application file for complete search history.

(56) References Cited

U.S. PATENT DOCUMENTS

| | | | |
|---|---|---|---|
| 9,104,537 B1 * | 8/2015 | Penilla | G06Q 30/0643 |
| 9,215,274 B2 | 12/2015 | Penilla et al. | |
| 9,288,270 B1 | 3/2016 | Penilla et al. | |
| 10,338,786 B2 | 7/2019 | Tuukkanen | |
| 10,789,835 B2 * | 9/2020 | Kislovskiy | G01C 21/3461 |
| 11,263,690 B2 * | 3/2022 | VanderZanden | G07C 5/008 |
| 2015/0304406 A1 | 10/2015 | Pennilla et al. | |

(Continued)

FOREIGN PATENT DOCUMENTS

CN    110060658    7/2019

*Primary Examiner* — Tai T Nguyen
(74) *Attorney, Agent, or Firm* — Burris Law, PLLC (57) ABSTRACT

A method of guiding an operator of a vehicle includes determining, in response to a vehicle-sharing request, whether a vehicle operation condition is satisfied based on state information of the vehicle. The method includes, in response to the vehicle operation condition being satisfied, identifying a set of vehicle operation instructions from a plurality of vehicle instructions corresponding to the vehicle, where the set of vehicle operation instructions correspond to the vehicle operation condition. The method includes, in response to the vehicle operation condition being satisfied, identifying a notification system from among a plurality of notification systems based on the vehicle operation condition, and providing, using the notification system, the set of vehicle operation instructions.

20 Claims, 4 Drawing Sheets

(56) References Cited

U.S. PATENT DOCUMENTS

2018/0025328 A1\* 1/2018 Penilla ............. G06Q 10/06314
                                                     705/305
2019/0236510 A1   8/2019 Kwak
2020/0041992 A1   2/2020 Nagashima et al.

\* cited by examiner

METHODS AND SYSTEMS FOR GUIDING AN OPERATOR OF A VEHICLE DURING A VEHICLE-SHARING SESSION

CROSS-REFERENCE TO RELATED APPLICATIONS

This application claims the benefit of and priority to U.S. Provisional Application No. 63/055,514 filed on Jul. 23, 2020. The disclosure of the above application is incorporated herein by reference.

FIELD

The present disclosure relates to systems and methods for guiding an operator of a vehicle during a vehicle-sharing session.

BACKGROUND

The statements in this section merely provide background information related to the present disclosure and may not constitute prior art.

Vehicle-sharing fleet managers may have a variety of vehicles that are available to rent for a predefined period of time using a vehicle-sharing application. However, when a user initiates a vehicle-sharing session, the user may not be aware of various features or operational instructions of the corresponding vehicle. As an example, the user may not be aware of how to turn on the vehicle, how to operate a shift-by-wire system of the vehicle, and/or how to pump fuel into the vehicle. Furthermore, when a user completes the vehicle-sharing session, the user may not be aware of how to properly complete the vehicle-sharing session. As an example, the user may not be aware that the vehicle must be placed in park, the windows must be rolled up, and the doors must be locked to properly complete the vehicle-sharing session.

SUMMARY

This section provides a general summary of the disclosure and is not a comprehensive disclosure of its full scope or all of its features.

The present disclosure provides a method of guiding an operator of a vehicle. The method includes determining, in response to a vehicle-sharing request, whether a vehicle operation condition is satisfied based on state information of the vehicle. The method includes, in response to the vehicle operation condition being satisfied, identifying a set of vehicle operation instructions from a plurality of vehicle instructions corresponding to the vehicle, where the set of vehicle operation instructions correspond to the vehicle operation condition. The method includes, in response to the vehicle operation condition being satisfied, identifying a notification system from among a plurality of notification systems based on the vehicle operation condition, and providing, using the notification system, the set of vehicle operation instructions.

In some forms, the plurality of notification systems include a plurality of graphical user interfaces, a plurality of audio systems, a plurality of tactile feedback systems, or a combination thereof.

In some forms, the plurality of graphical user interfaces include a client device graphical user interface disposed at a client device, a vehicle graphical user interface disposed at the vehicle, or a combination thereof. The plurality of audio systems include a client device audio system disposed at the client device, a vehicle audio system disposed at the vehicle, or a combination thereof. The plurality of tactile feedback systems include a client device tactile feedback system disposed at the client device, a vehicle tactile feedback system disposed at the vehicle, or a combination thereof.

In some forms, the method further includes determining whether an operation corresponding to the set of vehicle operation instructions is controllable using a graphical user interface from among the plurality of notification systems.

In some forms, the method further includes identifying the graphical user interface as the notification system in response to a determination that the operation is controllable using the user interface, where the graphical user interface provides the set of vehicle operation instructions as a display graphic for controlling the operation.

In some forms, the method further includes determining whether an operation corresponding to the set of vehicle operation instructions is controllable using at least one of a client device graphical user interface and a vehicle graphical user interface from among the plurality of notification systems.

In some forms, the method further includes, in response to determining that the operation is controllable using one of the client device graphical user interface and the vehicle graphical user interface, selecting at least one of a client device control mode and a vehicle control mode based on one of a user input and predefined control rules.

In some forms, the method further includes selecting the client device graphical user interface as the notification system in response to a selection of the client device control mode, where the client device graphical user interface provides the set of vehicle operation instructions as a display graphic for controlling the operation.

In some forms, the method further includes selecting the vehicle graphical user interface as the notification system in response to a selection of the vehicle control mode, where the vehicle graphical user interface provides the set of vehicle operation instructions as a display graphic for controlling the operation.

In some forms, the state information is indicative of an operation state of the vehicle and is based on sensor data obtained from one or more sensors of the vehicle, an input obtained from the plurality of notification systems, or a combination thereof.

In some forms, the vehicle operation condition is satisfied in response to the sensor data corresponding to a threshold value.

In some forms, the vehicle operation condition is satisfied in response to the input indicating a request for a given notification system from among the plurality of notification systems to provide the set of vehicle operation instructions.

The present disclosure provides a system for guiding an operator of a vehicle. The system includes a processor and a nontransitory computer-readable medium including machine-readable instructions that are executable by the processor. The machine-readable instructions include determining, in response to a vehicle-sharing request, whether a vehicle operation condition is satisfied based on state information of the vehicle. The instructions include, in response to the vehicle operation condition being satisfied, identifying a set of vehicle operation instructions from a plurality of vehicle instructions corresponding to the vehicle, where the set of vehicle operation instructions correspond to the vehicle operation condition, identifying a notification system from among a plurality of notification systems based on the vehicle operation condition, and providing, using the notification system, the set of vehicle operation instructions.

In some forms, the instructions further include determining whether an operation corresponding to the set of vehicle operation instructions is controllable using a graphical user interface from among the plurality of notification systems, and identifying the graphical user interface as the notification system in response to a determination that the operation is controllable using the user interface, where the graphical user interface provides the set of vehicle operation instructions as a display graphic for controlling the operation.

In some forms, the instructions further include determining whether an operation corresponding to the set of vehicle operation instructions is controllable using at least one of a client device graphical user interface and a vehicle graphical user interface from among the plurality of notification systems. The instructions further include, in response to determining that the operation is controllable using one of the client device graphical user interface and the vehicle graphical user interface, selecting at least one of a client device control mode and a vehicle control mode based on one of a user input and predefined control rules.

In some forms, the instructions further include selecting the client device graphical user interface as the notification system in response to a selection of the client device control mode, wherein the client device graphical user interface provides the set of vehicle operation instructions as a display graphic for controlling the operation, and selecting the vehicle graphical user interface as the notification system in response to a selection of the vehicle control mode, wherein the vehicle graphical user interface provides the set of vehicle operation instructions as a display graphic for controlling the operation.

In some forms, the instructions further include determining whether an operation corresponding to the set of vehicle operation instructions can be controlled using at least one of a client device graphical user interface and a vehicle graphical user interface from among the plurality of notification systems.

In some forms, the state information is indicative of an operation state of the vehicle and is based on sensor data obtained from one or more sensors of the vehicle, an input obtained from the plurality of notification systems, or a combination thereof.

In some forms, the vehicle operation condition is satisfied in response to at least one of: the sensor data corresponding to a threshold value and the input indicating a request for a given notification system from among the plurality of notification systems to provide the set of vehicle operation instructions.

The present disclosure provides a method including determining, in response to a vehicle-sharing request, whether a vehicle operation condition is satisfied based on state information of a vehicle, where the state information is indicative of an operation state of the vehicle and is based on sensor data obtained from one or more sensors of the vehicle. The method includes, in response to the vehicle operation condition being satisfied, identifying a set of vehicle operation instructions from a plurality of vehicle instructions corresponding to the vehicle, where the set of vehicle operation instructions correspond to the vehicle operation condition. The method includes, in response to the vehicle operation condition being satisfied, identifying a notification system from among a plurality of notification systems based on the vehicle operation condition and providing, using the notification system, the set of vehicle operation instructions, where the plurality of notification systems include a plurality of graphical user interfaces, a plurality of audio systems, a plurality of tactile feedback systems, or a combination thereof.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

The present disclosure relates to systems and methods for guiding an operator of the vehicle. More specifically, a vehicle-sharing system is configured to selectively provide vehicle operation instructions to an operator of the vehicle when a vehicle operation condition is satisfied. When the vehicle operation condition is satisfied, the vehicle-sharing system identifies and provides a set of vehicle operation instructions corresponding to the vehicle operation condition using a given notification system. As such, the vehicle-sharing system is configured to selectively provide visual, auditory, or haptic guidance and/or operation instructions to an operator for performing various vehicle functions.

Figure 1:
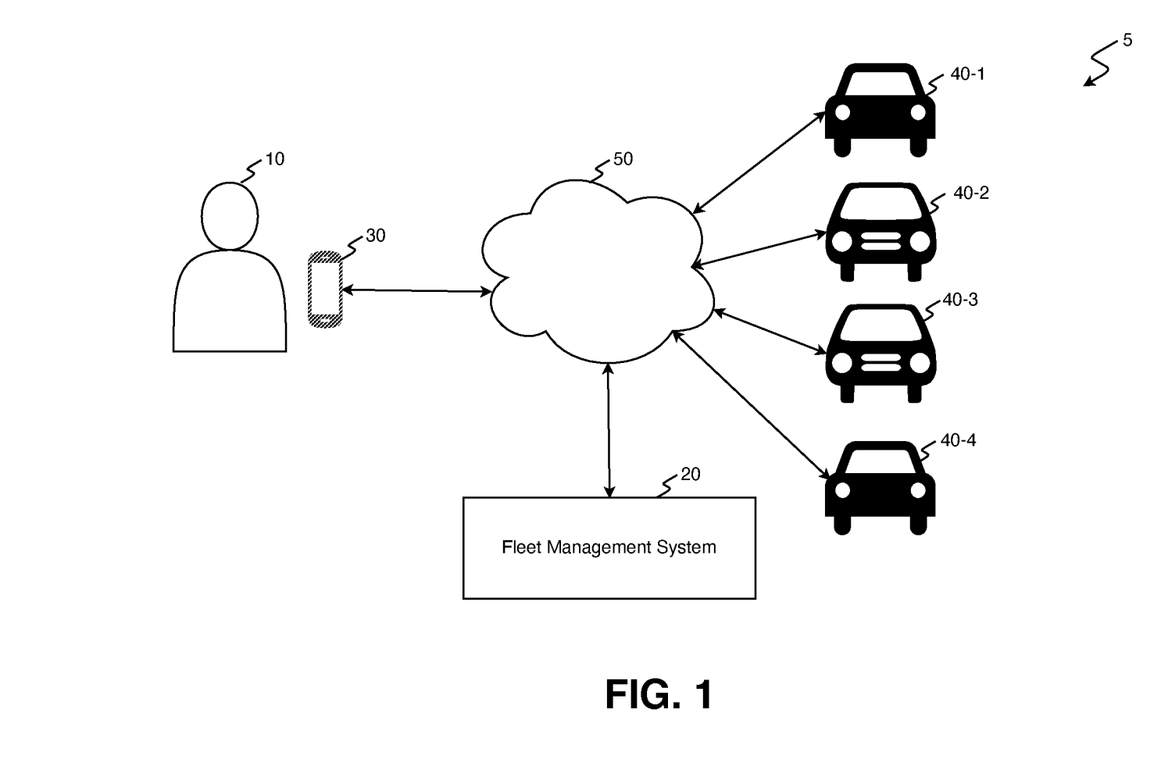
FIG. 1 illustrates a vehicle-sharing system in accordance with the teachings of the present disclosure.

Referring to FIG. 1, a vehicle-sharing system 5 is provided. The vehicle-sharing system 5 generally includes a user 10, a fleet management system 20, a client device 30, and vehicles 40-1, 40-2, 40-3, 40-4 (collectively referred to herein as "vehicle fleet 40"). In one form, the fleet management system 20, the client device 30, and the vehicle fleet 40 are communicably coupled via a network 50 and using one or more wireless communication protocols (e.g., a Bluetooth®-type protocol, a cellular protocol, a wireless fidelity (Wi-Fi)-type protocol, a near-field communication (NFC) protocol, an ultra-wideband (UWB) protocol, among others). While the vehicle fleet 40 illustrates four vehicles, it should be understood that the vehicle fleet 40 may include any number of vehicles in other forms.

In one form, the client device 30 is a computing device that utilizes a wireless communication protocol to generate a vehicle-sharing request. The client device 30 may include, but is not limited to, a computer, laptop, smartphone, tablet, personal digital assistant (PDA), a wearable device, among others. In one form, the user 10 generates one or more session parameters associated with a vehicle-sharing request using the client device 30. As an example, the session parameters include a start time of the vehicle-sharing session, an end time of the vehicle-sharing session, a monetary cost of the vehicle-sharing session, a location associated with a vehicle-sharing session request, a vehicle type, or a combination thereof.

In response to receiving the one or more session parameters, the fleet management system 20 identifies one of the vehicles from the vehicle fleet 40 associated with the vehicle-sharing request, such as the vehicle 40-1. Furthermore, the fleet management system 20 selectively provides a set of vehicle operation instructions corresponding to the vehicle 40-1 based on a vehicle operation condition being satisfied, as described below in further detail.

As used herein, "vehicle operation condition" refers to a vehicle condition, vehicle parameters, a type of input generated by the user 10, or a combination thereof that is satisfied before or during the vehicle-sharing session.

As used herein, "vehicle operation instructions" refer to instructions for operating a component/system of a vehicle from the vehicle fleet 40 and/or instructions for properly completing a vehicle-sharing session. As an example, the vehicle operation instructions may correspond to instructions for turning on/off the vehicle 40-1, operating a gear shift assembly, adjusting a seat and/or mirror position, controlling an infotainment system, pumping fuel into the vehicle 40-1, controlling a vehicle subsystem (e.g., a climate control system, a windshield wiper system, a locking system, among others), and the like. As another example, the vehicle operation instructions may correspond to various vehicle functions that need to be performed for properly completing the vehicle-sharing session (e.g., parking the vehicle 40-1, rolling up the windows of the vehicle 40-1, and locking the doors of the vehicle 40-1). It should be understood that the vehicle operation instructions may include instructions for various types of vehicle components/systems and are not limited to the examples provided herein.

Figure 2:
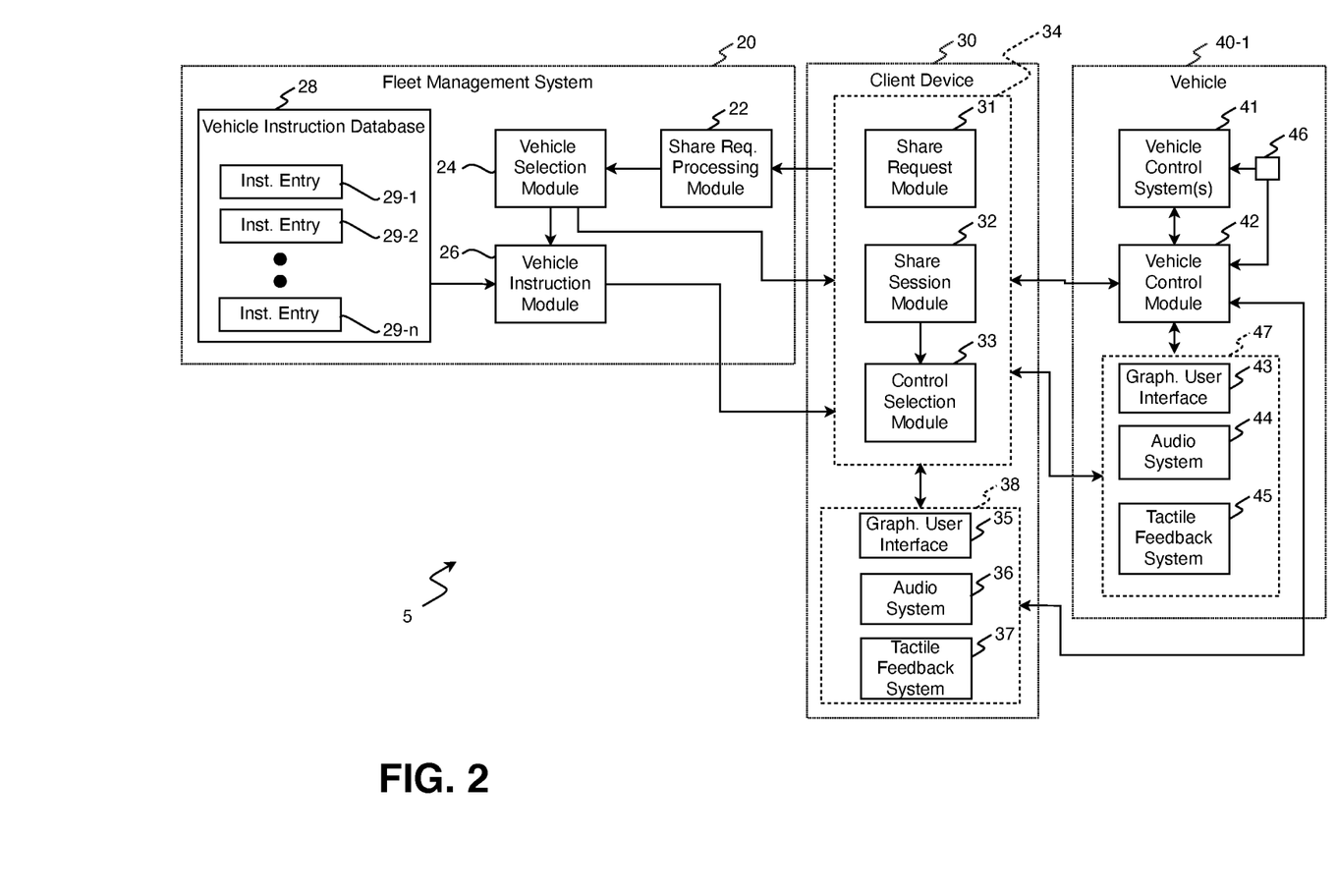
FIG. 2 is a functional block diagram of a vehicle-sharing system in accordance with the teachings of the present disclosure.

Referring to FIG. 2, a functional block diagram of the fleet management system 20, the client device 30, and the vehicle 40-1 is shown. While the fleet management system 20, the client device 30, and the vehicle 40-1 are illustrated as separate systems, it should be understood that any one of the components of the fleet management system 20, the client device 30, the vehicle 40-1 can be provided at other locations and communicably coupled accordingly. In order to execute the functionality described herein, the modules and control systems of the fleet management system 20, the client device 30, and the vehicle 40-1 may include one or more processor circuits that execute machine-readable instructions stored hi a nontransitory computer-readable medium, such as a read-only memory (ROM) circuit and/or a random-access memory (RAM) circuit.

In one form, the client device 30 includes a share request module 31, a share session module 32, a control selection module 33, a graphical user interface 35, an audio system 36, and a tactile feedback system 37. The share request module 31, the share session module 32, and the control selection module 33 may be part of a vehicle-sharing application 34. The graphical user interface 35, the audio system 36, and the tactile feedback system 37 are collectively referred to herein as "operator interfaces 38."

In one form, the graphical user interface 35 may include display components that enable the user 10 to interact with the client device 30 by manipulating graphical elements generated by the vehicle-sharing application 34. Furthermore, the graphical user interface 35 may include display components that visually provide a set of vehicle operation instructions and/or enable the user 10 to control various components of the vehicle 40-1 by manipulating the graphical elements, as described below in further detail. As an example, the graphical user interface 35 is a touchscreen component of the client device 30 that enables the user 10 to input the session parameters associated with the vehicle-sharing request. As another example, the graphical user interface 35 is an augmented reality (AR) device configured to provide the manipulatable graphical elements using an AR overlay operation.

In one form, the audio system 36 may include microphones, speakers, and/or natural language user interface modules for receiving voice queries from the user 10 and auditorily outputting a set of vehicle operation instructions, as described below in further detail. In one form, the tactile feedback system 37 may include a vibration motor circuit and driver for haptically outputting a set of vehicle operation instructions, as described below in further detail.

In one form, the share request module 31 is configured to provide an application interface for receiving a vehicle-sharing request and session parameters thereof from the user 10. In response to receiving the one or more session parameters, the share request module 31 provides the corresponding vehicle-sharing request session parameters to the fleet management system 20. In one form, the share session module 32 obtains a digital key to initiate the vehicle-sharing session and information corresponding to a selected vehicle (e.g., the vehicle 40-1) in response to the fleet management system 20 processing the vehicle-sharing request. In one form, the vehicle-sharing session 32 initiates the vehicle-sharing session when location data of the client device 30 indicates that the user 10 intends to enter the vehicle 40-1 or is inside of the vehicle 40-1. Examples systems for detecting whether the user 10 of the client device 30 intends to enter the vehicle 40-1 or is inside of the vehicle 40-1 are described in co-pending U.S. patent application Ser. No. 16/359,050 titled "STATISTICS BASED SYSTEMS AND METHODS FOR ACTIVATING VEHICLE FUNCTIONS," which is commonly owned and the disclosure of which is incorporated by reference.

In one form, the control selection module 33 obtains the vehicle operation instructions from the fleet management system 20 and identifies a set of vehicle operation instructions corresponding to a vehicle operation condition. As an example, if the vehicle operation condition indicates that the user 10 has not started the vehicle 40-1 within a threshold period of time, the control selection module 33 identifies the vehicle operation instructions corresponding to starting the vehicle 40-1 from among the vehicle operation instructions associated with the vehicle 40-1. Furthermore, the control selection module 33 is configured to identify a notification system of the vehicle-sharing system 5 for providing the vehicle operation instructions and/or determine whether a corresponding operation is controllable using, for example, the graphical user interface 35, as described below in further detail.

In one form, the fleet management system 20 includes a share request processing module 22, a vehicle selection module 24, a vehicle instruction module 26, and a vehicle instruction database 28 including a plurality of instruction entries 29-1, 29-2, . . . 29-n (collectively referred to herein as "instruction entries 29").

In one form, the vehicle selection module 24 selects a corresponding vehicle (e.g., the vehicle 40-1) from the vehicle fleet 40 and reserves a vehicle sharing session based on the session parameters of the vehicle-sharing request. In one form, the vehicle instruction module 26 identifies one or more instruction entries 29 from the vehicle instruction database 28 based on the selected vehicle 40-1. In one form, each instruction entry 29 includes, for a given vehicle from among the vehicle fleet 40, visual, auditory, and/or haptic instructions for operating a given component/system of the vehicle or for properly completing the vehicle-sharing session. As an example, a first instruction entry of the one or more identified instruction entries 29 includes instructions for turning on/off the vehicle 40-1, and a second instruction entry of the one or more identified instruction entries 29 includes operating a push-by-wire gear shift assembly of the vehicle 40-1. Furthermore, a third instruction entry of the one or more identified instruction entries 29 may include instructions for adjusting a seat and/or mirror position of the vehicle 40-1, and a fourth instruction entry of the one or more identified instruction entries 29 may include instructions for pumping fuel into the vehicle 40-1. It should be understood that the one or more identified instruction entries 29 may include any number of instruction entries and is not limited to the examples described herein. In one form, the vehicle selection module 24 provides the digital key and information corresponding to the selected vehicle 40-1 to the share session module 32.

In one form, the vehicle 40-1 includes one or more vehicle control systems 41, a vehicle control module 42, a graphical user interface 43, an audio system 44, a tactile feedback system 45, and one or more sensors 46. The graphical user interface 43, the audio system 44, and the tactile feedback system 45 are collectively referred to herein as "operator interfaces 47." The one or more vehicle control systems 41, the vehicle control module 42, the one or more sensors 46, and the operator interfaces 47 may be communicably coupled using a vehicle interface, which may be, for example, a controller area network (CAN), a local interconnect network (LIN), a clock extension peripheral interface (CXPI) bus, among others.

In one form, the graphical user interface 43 is similar to the graphical user interface 35, the audio system 44 is similar to the audio system 36, and the tactile feedback system 45 is similar to the tactile feedback system 37.

In one form, the one or more sensors 46 include various types of sensors to generate various operational information of one or more vehicle control systems 41 and/or information related to the surrounding environment of the vehicle 40-1. As an example, the sensors 46 include door sensors configured to determine entry into and/or exit from the vehicle 40-1. Example door sensors are described in are described in co-pending U.S. patent application Ser. No. 16/359,066 titled "ACTIVATING VEHICLE FUNCTIONS BASED ON VEHICLE OCCUPANT LOCATION," which is commonly owned and the disclosure of which is incorporated by reference. As another example the one or more sensors 46 include fuel level sensors for detecting a fuel level of the vehicle 40-1.

Additionally, the sensors 46 may include an ignition sensor to detect whether the vehicle 40-1 is on or off, imaging sensors that provide image data surrounding the vehicle 40-1, an accelerometer to detect whether the vehicle 40-1 is idling, and/or location sensors, such as a global navigation satellite system (GNSS) sensor. The image sensors may include, but are not limited to: a two-dimensional (2D) camera, a 3D camera, an infrared sensor, a radar scanner, a laser scanner, a light detection and ranging (LIDAR) sensor, an ultrasonic sensor, among others. It should be understood that the one or more sensors 46 may include any type of vehicle sensor and is not limited to the examples described herein. The sensors 46 provide the operational information to the vehicle control module 42 and/or the one or more vehicle control systems 41.

In one form, the vehicle control module 42 is configured to determine whether the vehicle operation condition is satisfied. In one form, the vehicle control module 42 determines a vehicle operation condition is satisfied when the user requests to obtain a set of vehicle operation instructions, such as starting the vehicle 40-1 operator interfaces 38. As described below in further detail, one of the operator interfaces 38, 47 may provide the vehicle operation instructions In one form, the vehicle control module 42 determines whether the vehicle operation condition is satisfied based on state information of the vehicle 40-1. The state information is indicative of an operation state of the vehicle 40-1 and is based on sensor data obtained from the sensors 46. As an example, the vehicle control module 42 determines that the vehicle operation condition is satisfied if the user 10 has not started the vehicle 40-1 within a threshold period of time. More specifically, if the data from the door sensor indicates that the user 10 has entered the vehicle 40-1 and data from the ignition sensor indicates the user 10 has not started the vehicle 40-1 within a threshold period of time, the vehicle control module 42 determines that the vehicle operation condition is satisfied. As another example, if the fuel level of the vehicle 40-1 is below a threshold value, as indicated by data from the fuel level sensor, the vehicle control module 42 determines that the vehicle operation condition is satisfied. In yet another example, if the vehicle 40-1 is turned on and is idling for a period of time greater than a predetermined threshold time, as indicated by the accelerometer and the ignition sensor, the vehicle control module 42 determines that the vehicle operation condition is satisfied. As yet another example, the vehicle control module 42 determines that the vehicle operation condition is satisfied if the user 10 performs an operation that deviates from a nominal or predicted sequence of operations (e.g., the user 10 begins to operate the vehicle 40-1 prior to fastening a seatbelt of the vehicle 40-1). It should be understood various other state information of the vehicle 40-1 may be used for the vehicle operation condition and is not limited to the examples provided herein. Once satisfied, the vehicle control module 42 is configured to transmit a signal to the control selection module 33 of the vehicle-sharing application indicating that the vehicle operation condition is satisfied and that vehicle operation instructions can be provided.

Based on the above, during operation, the user 10 inputs a vehicle-sharing request and session parameters thereof using an interface provided by the vehicle-sharing application 34 and one or more of the operator interfaces 38. The vehicle-sharing application 34 provides the vehicle-sharing request to the share request processing module 22 of the fleet management system 20. The vehicle selection module 24 then selects a corresponding vehicle (e.g., the vehicle 40-1) from the vehicle fleet 40 and reserves a vehicle sharing session based on the session parameters. Subsequently, the vehicle instruction module 26 identifies one or more of the instruction entries 29 based on the selected vehicle 40-1 and provides the vehicle operation instructions thereof to the vehicle-sharing application 34.

The vehicle-sharing application 34 obtains the vehicle operation instructions and selectively identifies a set of the vehicle operation instructions when the vehicle control module 42 determines the vehicle operation condition is satisfied. As an example, if the vehicle operation condition indicates that the user 10 has not started the vehicle 40-1 within a threshold period of time, the vehicle-sharing application 34 identifies the vehicle operation instructions corresponding to starting the vehicle 40-1 from among the vehicle operation instructions associated with the vehicle 40-1.

Furthermore, the vehicle-sharing application 34 is configured to identify a notification system from among the operator interfaces 38, 47 for providing the vehicle operation instructions based on the type of vehicle operation instructions. As an example, the vehicle-sharing application 34 identifies one of the graphical user interfaces 35, 43 as the notification systems if the vehicle operation instructions are visual instructions. As another example, the vehicle-sharing application 34 identifies one of the audio systems 36, 44 as the notification systems if the vehicle operation instructions are auditory instructions. As an additional example, the vehicle-sharing application 34 identifies one of the tactile feedback systems 37, 45 as the notification systems if the vehicle operation instructions are haptic instructions.

In one form, the vehicle-sharing application 34 determines whether an operation corresponding to the identified set of vehicle operation instructions is controllable using at least one of the graphical user interfaces 35, 43. As an example, when the vehicle operation instructions correspond to turning on or off the vehicle 40-1, the vehicle-sharing application 34 determines whether the vehicle 40-1 can be turned on or off using at least one of the graphical user interfaces 35, 43. As another example, when the vehicle operation instructions correspond to shift-by-wire instructions, the vehicle-sharing application 34 determines whether the shift-by-wire system can be controlled using at least one of the graphical user interfaces 35, 43.

In response to a determination that at least one of the graphical user interfaces 35, 43 can control the corresponding operation, the vehicle-sharing application 34 may identify at least one of the graphical user interfaces 35, 43 as the notification system for providing the vehicle operation instructions as a display graphic for controlling the operation. Furthermore, the vehicle-sharing application 34 may select from one of the graphical user interfaces 35, 43 for providing the display graphic based on an input indicating a user selection of a client device control mode or a vehicle control mode via the graphical user interfaces 35, 43, predefined control rules, or a combination thereof. Example control rules include, but are not limited to: always identifying the graphical user interface 43 as the notification system if the operation corresponding to the identified set of vehicle operation instructions is controllable using the graphical user interface 43, always identifying the graphical user interface 35 as the notification system if the operation corresponding to the identified set of vehicle operation instructions is controllable using the graphical user interface 35, among others.

In one form, the identified notification system is configured to provide the respective vehicle operation instructions. As an example, the graphical user interfaces 35, 43 are configured to provide visual instructions corresponding to the operation and/or display graphics for controlling the operation in response to being identified as the notification system. As another example, the audio systems 36, 44 are configured to provide auditory instructions corresponding to the operation in response to being identified as the notification system.

Figure 3:
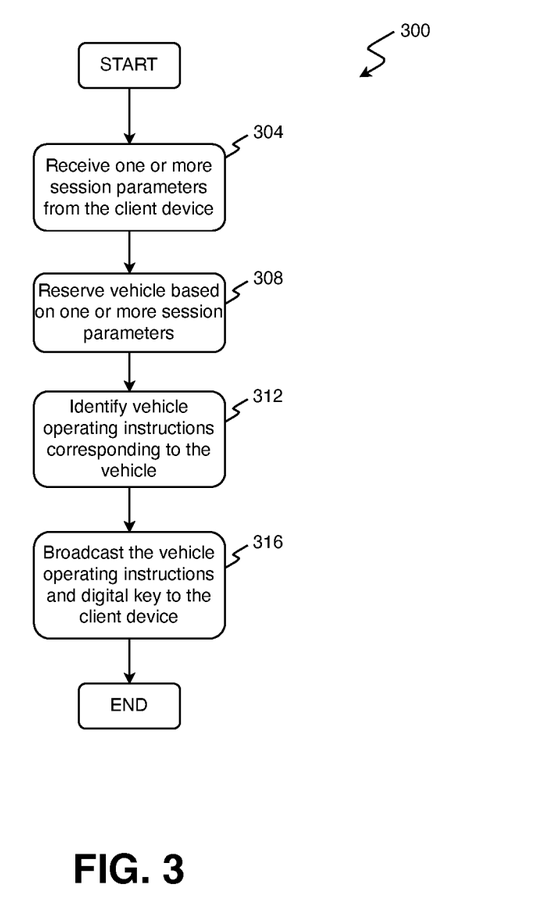
FIG. 3 illustrates an example control routine performed by a fleet management system in accordance with the teachings of the present disclosure.

With reference to FIG. 3, an example routine 300 performed by the fleet management system 20 is shown. At 304, the fleet management system 20 receives the one or more session parameters from the client device 30. As an example, the fleet management system 20 receives a start time and an end time of the vehicle-sharing session and a vehicle type. At 308, the fleet management system 20 reserves the vehicle (e.g., the vehicle 40-1) based on the one or more session parameters. At 312, the fleet management system 20 identifies the set of vehicle operating instructions corresponding to the selected vehicle. At 316, the fleet management system 20 broadcasts the identified set of vehicle operating instructions and the digital key to the client device 30.

Figure 4:
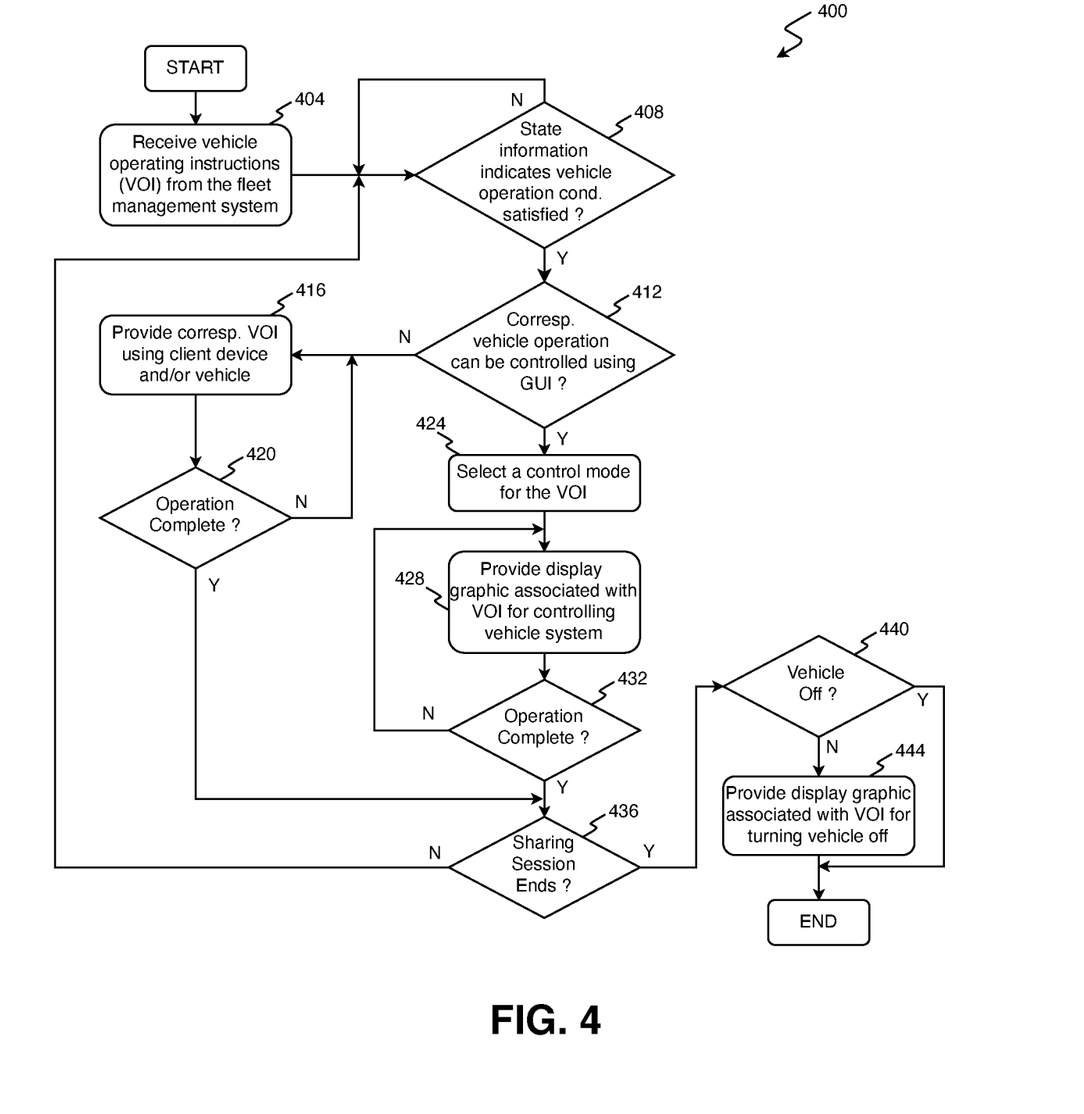
FIG. 4 illustrates an example control routine performed by a client device and/or vehicle in accordance with the teachings of the present disclosure.

With reference to FIG. 4, an example routine 400 performed by the vehicle-sharing system 5 is shown. At 404, the client device 30 receives the identified set of vehicle operating instructions from the fleet management system 20. At 408, the vehicle 40-1 and/or the client device 30 determine whether the state information indicates that the vehicle operation condition is satisfied. If the vehicle operation condition is satisfied, the routine 400 proceeds to 412. Otherwise, the routine 400 remains at 408 until the vehicle operation condition is satisfied.

At 412, the client device 30 determines whether the corresponding vehicle operation can be controlled using one of the graphical user interfaces 35, 43. If the corresponding vehicle operation can be controlled using one of the graphical user interfaces 35, 43, the routine 400 proceeds to 424. Otherwise, if the corresponding vehicle operation is not controllable using one of the graphical user interfaces 35, 43, the routine 400 proceeds to 416. At 416, the client device 30 and/or the vehicle 40-1 provide the set of identified vehicle instructions using at least one of the audio systems 36, 44 and the tactile feedback systems 37, 45 and proceeds to 420. At 420, the vehicle 40-1 determines whether the corresponding operation is complete. If the operation is complete, the routine 400 proceeds to 436. Otherwise, the routine 400 proceeds to 416 if the operation is not complete.

At 424, the client device 30 or the vehicle 40-1 select a control mode for the vehicle operation instructions. At 428, at least one of the graphical user interfaces 35, 43 provide a display graphic for controlling the corresponding vehicle system (e.g., display graphics for turning on/off the vehicle 40-1, display graphics for operating a shift by wire system of the vehicle 40-1, among others). At 432, the vehicle 40-1 determines whether the corresponding operation is complete. If the operation is complete, the routine 400 proceeds to 436. Otherwise, the routine 400 proceeds to 428 if the operation is not complete.

At 436, the client device 30 and/or the vehicle 40-1 determine if the vehicle-sharing session has ended based on the one or more session parameters. If the vehicle-sharing session has ended, the routine 400 proceeds to 440. If the vehicle-sharing session has not ended, the routine 400 proceeds to 408. At 440, the vehicle 40-1 determines whether it is turned off. If the vehicle 40-1 is not turned off, the routine 400 proceeds to 444, where the client device 30 and/or the vehicle 40-1 provide a display graphic associated with vehicle operating instructions for turning the vehicle 40-1 off and/or properly completing the vehicle-sharing session. Otherwise, if the vehicle 40-1 is turned off, the routine 400 ends.

It should be readily understood that routines 300, 400 are example control routines and other control routines may be implemented.

The vehicle-sharing system 5 described herein is configured to selectively provide vehicle operation instructions to the user 10 of the vehicle 40-1 when a vehicle operation condition is satisfied. Furthermore, when the vehicle operation condition is satisfied, the vehicle-sharing system 5 identifies and provides a set of vehicle operation instructions corresponding to the vehicle operation condition using a given notification system from the various operator interfaces 38, 47. As such, the vehicle-sharing system 5 is configured to selectively provide visual, auditory, or haptic guidance and/or operation instructions to the user 10 for performing various vehicle functions.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, manufacturing technology, and testing capability.

As used herein, the phrase at least one of A, B, and C should be construed to mean a logical (A OR B OR C), using a non-exclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure.

In the figures, the direction of an arrow, as indicated by the arrowhead, generally demonstrates the flow of information (such as data or instructions) that is of interest to the illustration. For example, when element A and element B exchange a variety of information, but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, the term "module" and/or "controller" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The term memory is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general-purpose computer to execute one or more particular functions embodied in computer programs. The functional blocks, flowchart components, and other elements described above serve as software specifications, which can be translated into the computer programs by the routine work of a skilled technician or programmer.

What is claimed is:

1. A method of guiding an operator of a vehicle, the method comprising:
   determining, by a fleet manager computing device communicably coupled to the vehicle and in response to the fleet manager computing device receiving a vehicle-sharing request from a client device, whether a vehicle operation condition is satisfied based on state information of the vehicle;
   in response to the vehicle operation condition being satisfied:
      identifying, by the fleet manager computing device, a set of vehicle operation instructions from a plurality of vehicle instructions corresponding to the vehicle, wherein the set of vehicle operation instructions correspond to the vehicle operation condition;
      identifying, by the fleet manager computing device, a notification system from among a plurality of notification systems of the vehicle based on the vehicle operation condition; and
   providing, using the notification system of the vehicle, the set of vehicle operation instructions to the operator.

2. The method of claim 1, wherein the plurality of notification systems include a plurality of graphical user interfaces, a plurality of audio systems, a plurality of tactile feedback systems, or a combination thereof.

3. The method of claim 2, wherein:
   the plurality of graphical user interfaces include a client device graphical user interface disposed at the client device, a vehicle graphical user interface disposed at the vehicle, or a combination thereof;
   the plurality of audio systems include a client device audio system disposed at the client device, a vehicle audio system disposed at the vehicle, or a combination thereof; and
   the plurality of tactile feedback systems include a client device tactile feedback system disposed at the client device, a vehicle tactile feedback system disposed at the vehicle, or a combination thereof.

4. The method of claim 1 further comprising determining whether an operation corresponding to the set of vehicle operation instructions is controllable using a graphical user interface from among the plurality of notification systems.

5. The method of claim 4 further comprising identifying the graphical user interface as the notification system in response to a determination that the operation is controllable using the user interface, wherein the graphical user interface provides the set of vehicle operation instructions as a display graphic for controlling the operation.

6. The method of claim 1 further comprising determining whether an operation corresponding to the set of vehicle operation instructions is controllable using at least one of a client device graphical user interface and a vehicle graphical user interface from among the plurality of notification systems.

7. The method of claim 6 further comprising, in response to determining that the operation is controllable using one of the client device graphical user interface and the vehicle graphical user interface, selecting at least one of a client device control mode and a vehicle control mode based on one of a user input and predefined control rules.

8. The method of claim 7 further comprising selecting the client device graphical user interface as the notification system in response to a selection of the client device control mode, wherein the client device graphical user interface provides the set of vehicle operation instructions as a display graphic for controlling the operation.

9. The method of claim 7 further comprising selecting the vehicle graphical user interface as the notification system in response to a selection of the vehicle control mode, wherein the vehicle graphical user interface provides the set of vehicle operation instructions as a display graphic for controlling the operation.

10. The method of claim 1, wherein the state information is indicative of an operation state of the vehicle and is based on sensor data obtained from one or more sensors of the vehicle, an input obtained from the plurality of notification systems, or a combination thereof.

11. The method of claim 10, wherein the vehicle operation condition is satisfied in response to the sensor data corresponding to a threshold value.

12. The method of claim 10, wherein the vehicle operation condition is satisfied in response to the input indicating a request for a given notification system from among the plurality of notification systems to provide the set of vehicle operation instructions.

13. A system for guiding an operator of a vehicle, the system comprising:
 a processor; and
 a nontransitory computer-readable medium including machine-readable instructions that are executable by the processor, wherein the machine-readable instructions include:
  determining, in response to receiving a vehicle-sharing request from a client device, whether a vehicle operation condition is satisfied based on state information of the vehicle;
  in response to the vehicle operation condition being satisfied:
   identifying a set of vehicle operation instructions from a plurality of vehicle instructions corresponding to the vehicle, wherein the set of vehicle operation instructions correspond to the vehicle operation condition;
   identifying a notification system from among a plurality of notification systems of the vehicle based on the vehicle operation condition; and
   broadcasting a command to provide, using the notification system of the vehicle, the set of vehicle operation instructions to the operator.

14. The system of claim 13, wherein the instructions further include:
 determining whether an operation corresponding to the set of vehicle operation instructions is controllable using a graphical user interface from among the plurality of notification systems, and
 identifying the graphical user interface as the notification system in response to a determination that the operation is controllable using the user interface, wherein the graphical user interface provides the set of vehicle operation instructions as a display graphic for controlling the operation.

15. The system of claim 13, wherein the instructions further include:
 determining whether an operation corresponding to the set of vehicle operation instructions is controllable using at least one of a client device graphical user interface and a vehicle graphical user interface from among the plurality of notification systems; and
 in response to determining that the operation is controllable using one of the client device graphical user interface and the vehicle graphical user interface, selecting at least one of a client device control mode and a vehicle control mode based on one of a user input and predefined control rules.

16. The system of claim 15, wherein the instructions further include:
 selecting the client device graphical user interface as the notification system in response to a selection of the client device control mode, wherein the client device graphical user interface provides the set of vehicle operation instructions as a display graphic for controlling the operation; and
 selecting the vehicle graphical user interface as the notification system in response to a selection of the vehicle control mode, wherein the vehicle graphical user interface provides the set of vehicle operation instructions as a display graphic for controlling the operation.

17. The system of claim 13, wherein the instructions further include determining whether an operation corresponding to the set of vehicle operation instructions can be controlled using at least one of a client device graphical user interface and a vehicle graphical user interface from among the plurality of notification systems.

18. The system of claim 13, wherein the state information is indicative of an operation state of the vehicle and is based on sensor data obtained from one or more sensors of the vehicle, an input obtained from the plurality of notification systems, or a combination thereof.

19. The system of claim 18, wherein the vehicle operation condition is satisfied in response to at least one of:
 the sensor data corresponding to a threshold value; and
 the input indicating a request for a given notification system from among the plurality of notification systems to provide the set of vehicle operation instructions.

20. A method comprising:
 determining, by a fleet manager computing device and in response to receiving a vehicle-sharing request from a client device, whether a vehicle operation condition is satisfied based on state information of a vehicle, wherein the state information is indicative of an operation state of the vehicle and is based on sensor data obtained from one or more sensors of the vehicle, and wherein the fleet manager computing device is communicably coupled to the vehicle;
 in response to the vehicle operation condition being satisfied:
  identifying, by the fleet manager computing device, a set of vehicle operation instructions from a plurality of vehicle instructions corresponding to the vehicle, wherein the set of vehicle operation instructions correspond to the vehicle operation condition;
  identifying, by the fleet manager computing device, a notification system from among a plurality of notification systems of the vehicle based on the vehicle operation condition; and
  providing, using the notification system of the vehicle, the set of vehicle operation instructions to an operator, wherein the plurality of notification systems include a plurality of graphical user interfaces, a plurality of audio systems, a plurality of tactile feedback systems, or a combination thereof.

\* \* \* \* \*

UNITED STATES PATENT AND TRADEMARK OFFICE
CERTIFICATE OF CORRECTION

PATENT NO. : 11,618,378 B2  
APPLICATION NO. : 17/218406  
DATED : April 4, 2023  
INVENTOR(S) : Christian Munte et al.

It is certified that error appears in the above-identified patent and that said Letters Patent is hereby corrected as shown below:

On the Title Page

Item (72) Inventors, Line 2: Delete "Gross" and insert --Grosse-- therefor

Signed and Sealed this
Twenty-seventh Day of June, 2023

Katherine Kelly Vidal  
*Director of the United States Patent and Trademark Office*